US011954341B2

(12) United States Patent
Shen et al.

(10) Patent No.: US 11,954,341 B2
(45) Date of Patent: Apr. 9, 2024

(54) EXTERNAL STORAGE OF INTERNAL DRIVE MANAGEMENT DATA

(71) Applicant: Seagate Technology LLC, Fremont, CA (US)

(72) Inventors: Jin Quan Shen, Singapore (SG); Xiong Liu, Singapore (SG); David W. Miller, Boulder, CO (US); Choonwei Ng, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/737,719

(22) Filed: May 5, 2022

(65) Prior Publication Data

US 2023/0359375 A1 Nov. 9, 2023

(51) Int. Cl.
*G06F 3/06* (2006.01)
*G06F 9/4401* (2018.01)

(52) U.S. Cl.
CPC .......... *G06F 3/0634* (2013.01); *G06F 3/0625* (2013.01); *G06F 3/0658* (2013.01); *G06F 9/4401* (2013.01); *G06F 3/0679* (2013.01)

(58) Field of Classification Search
CPC .... G06F 3/0634; G06F 3/0625; G06F 3/0658; G06F 3/0679; G06F 9/4401; G06F 3/06
See application file for complete search history.

(56) References Cited

U.S. PATENT DOCUMENTS

| 7,970,955 | B2 * | 6/2011 | Minakata | G06F 3/0664 707/609 |
| 10,033,813 | B2 | 7/2018 | Kripalani et al. | |
| 10,452,623 | B2 | 10/2019 | Nivala et al. | |
| 10,613,882 | B2 | 4/2020 | Yang et al. | |
| 10,802,853 | B2 | 10/2020 | Trantham et al. | |
| 10,871,922 | B2 | 12/2020 | East | |
| 10,936,350 | B2 | 3/2021 | Yang et al. | |
| 11,119,797 | B2 | 9/2021 | Trantham et al. | |
| 2006/0129987 | A1 * | 6/2006 | Patten Benhase | G06F 3/0632 717/121 |
| 2010/0082914 | A1 * | 4/2010 | Suzuki | G06F 16/13 711/E12.001 |
| 2010/0274928 | A1 * | 10/2010 | Minakata | G11B 27/34 710/13 |
| 2014/0325262 | A1 | 10/2014 | Cooper et al. | |

(Continued)

FOREIGN PATENT DOCUMENTS

| WO | WO-2011160321 A1 * | 12/2011 | ......... H01L 25/0657 |
| WO | WO-2016181464 A1 * | 11/2016 | ........... G06F 12/023 |

OTHER PUBLICATIONS

M. Zeller, S. Grosse, D. Eilers and R. Knorr, "Fail-Safe Data Management in Self-Healing Automotive Systems, " 2010 Sixth International Conference on Autonomic and Autonomous Systems, Cancun, Mexico, 2010, pp. 24-29.*

(Continued)

*Primary Examiner* — Pierre Michel Bataille

(74) *Attorney, Agent, or Firm* — Westman, Champlin & Koehler, P.A.

(57) ABSTRACT

A data storage system includes a plurality of data storage drives, and a system controller coupled to each data storage drive of the plurality of data storage drives. The system controller is configured to store internal drive management data for each data storage drive of the plurality of data storage drives.

16 Claims, 5 Drawing Sheets

(56) References Cited

U.S. PATENT DOCUMENTS

| | | | |
|---|---|---|---|
| 2015/0149700 A1* | 5/2015 | Lucas | G11C 5/141 |
| | | | 711/103 |
| 2016/0283336 A1* | 9/2016 | Petersen | G06F 11/2015 |
| 2017/0031409 A1* | 2/2017 | Lester | G06F 3/0653 |
| 2020/0183598 A1* | 6/2020 | Hong | G06F 3/0634 |
| 2020/0192738 A1* | 6/2020 | Sarkar | G06N 20/00 |
| 2021/0349636 A1* | 11/2021 | Gold | G06F 13/28 |

OTHER PUBLICATIONS

S. S. Rizvi and T.-S. Chung, "Flash memory SSD based DBMS for data warehouses and data marts," 2010 The 2nd International Conference on Computer and Automation Engineering (ICCAE), Singapore, 2010, pp. 557-559.*

E. Bougioukou, M. Varsamou, N. Toulgaridis and T. Antonakopoulos, "A Real-Time Non-Volatile Memory Analyzer and its Use on the Evaluation of Storage Devices based on NAND Flash Memories," 2020 IEEE International Instrumentation and Measurement Technology Conference (I2MTC), Dubrovnik, Croatia, 2020, pp. 1-6.*

"Seagate AP4U100", https://www.seagate.com/files/www-content/datasheets/pdfs/exos-ap-4u100-DS2012-5-2103US-en_US.pdf, 3 pages.

"How Western Digital Created OptiNAND™, a New Flash-Enhanced HDD Architecture", https://blog.westerndigital.com/optinand/, 11 pages.

* cited by examiner

EXTERNAL STORAGE OF INTERNAL DRIVE MANAGEMENT DATA

SUMMARY

In one embodiment, a data storage system is provided. The data storage system includes a plurality of data storage drives, and a system controller coupled to each data storage drive of the plurality of data storage drives. The system controller is configured to store internal drive management data for each data storage drive of the plurality of data storage drives.

In another embodiment, a method is provided. The method includes extracting, by a system controller, internal drive management data from each data storage drive of a plurality of data storage drives in a data storage system including the system controller. The method also includes storing the extracted internal drive management data in a non-volatile memory of the system controller.

In yet another embodiment, a data storage drive is provided. The data storage drive includes a memory configured to store internal drive management data. The data storage drive also includes a drive controller that is communicatively coupled to the memory. The drive controller is configured to send the internal drive management data to a system controller that is external to the data storage drive.

This summary is not intended to describe each disclosed embodiment or every implementation of the external storage of internal drive management data. Many other novel advantages, features, and relationships will become apparent as this description proceeds. The figures and the description that follow more particularly exemplify illustrative embodiments.

DETAILED DESCRIPTION

Embodiments of the disclosure relate to the storage of internal data storage drive management data (e.g., data utilized for reliability and performance of the drive) in an external controller.

Large storage systems may contain more than 100 data storage drives (e.g., hard disc drives (HDDs) or hybrid drives) to provide mass capacity storage. Each HDD has many background activities that help maintain HDD health, HDD performance, data integrity, etc. These activities may include storing adjacent track interference (ATI)-related information, error correction coding information, etc. Such HDD internal data is managed by a file management system within the HDD.

An example HDD internal drive management data file (e.g., an ATI information file) has a copy that is stored in dynamic random access memory (DRAM) in the HDD during operation of the HDD. Also, in current data storage systems, the internal drive management data file has multiple copies that are saved in a system zone of disc media as nonvolatile storage to prevent data loss when power is turned off. When the file data is changed, all copies of the file are updated. Updating files into the system zone of disc media has two drawbacks:

Increased HDD power consumption due to seeking to system tracks and writing data to disc media.

Decreased HDD host data transfer performance since the HDD waits for the internal drive management data to be written to the disc media completely, and then reads/writes host data from/to the disc media.

Sizes of some data files may be greater than 50 megabytes (MB), and the HDD may take 20 milliseconds (ms)~100 ms to update such a file into disc media, and storing two copies of a 50 MB file at a system zone may take up to 550 ms. Write time may be enlarged to some seconds when external disturbances such as vibration or shock exist.

To address the above problems, embodiments of the disclosure utilize a controller of the storage system, which may include an operating system and non-volatile memory, to manage and store at least some HDD internal data, such as an ATI information file, a super parity table, field adjusted fly height (FAFH) parameters, etc., so that the data in these files/tables need not be saved into the HDD's system zone of disc media. This reduces HDD power consumption, increases HDD data transfer performance and shortens HDD time to ready (TTR). Prior to providing details regarding the different embodiments, a description of an illustrative operating environment is provided below.

Figure 1A:
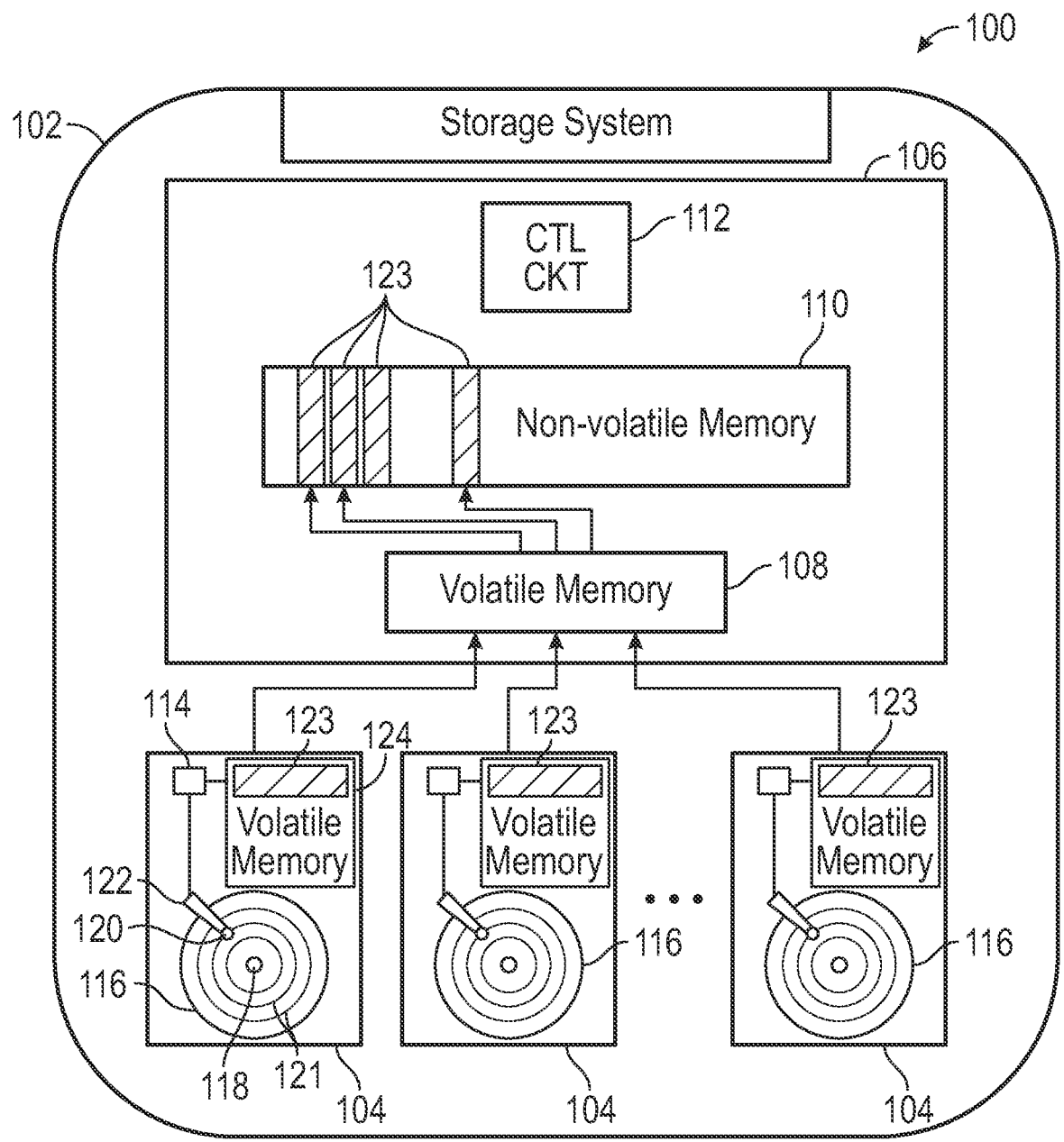
FIG. 1A is a simplified block diagram of a data storage system in accordance with one embodiment.

FIG. 1A shows an illustrative operating environment in which certain specific embodiments disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are sometimes used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Figure 1B:
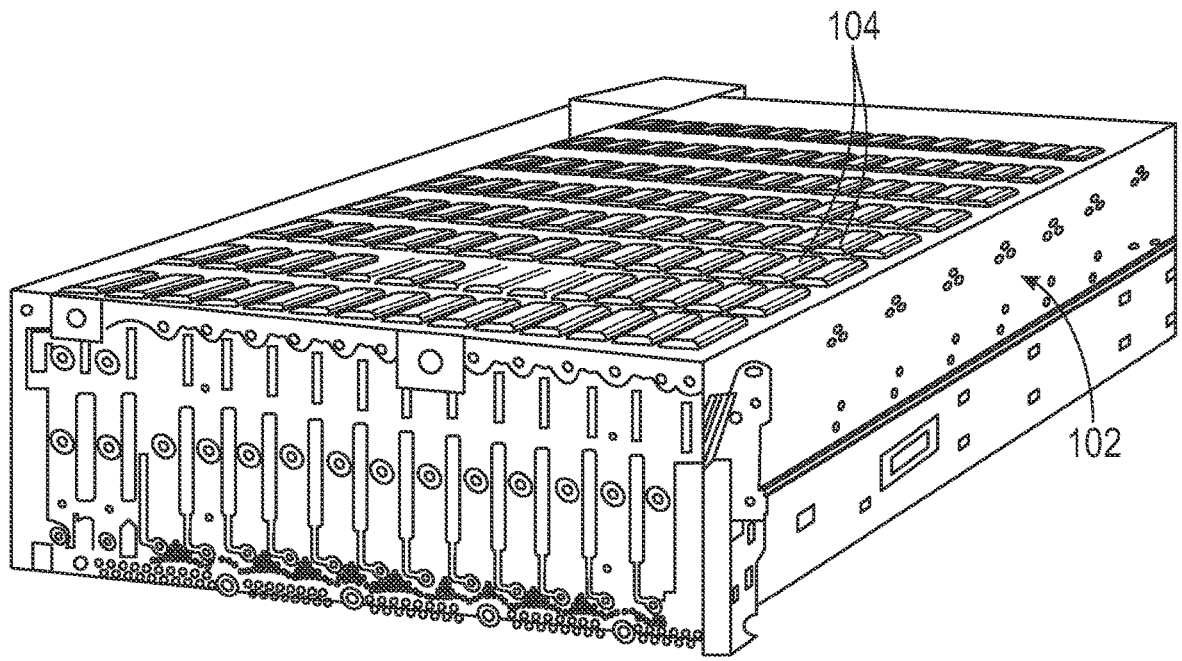
FIG. 1B is a perspective view of a data storage system including data storage devices in a carriage in accordance with one embodiment.

FIG. 1A illustrates a data storage system 100 in accordance with an embodiment of the disclosure. Data storage system 100 may include a closed housing or a carriage 102 within which a plurality of data storage drives (e.g., HDDs or hybrid drives) 104 may be included. FIG. 1B shows data storage devices 104 in a carriage 102.

As can be seen in FIG. 1A, each data storage drive 104 is communicatively coupled to a same system controller 106 that may include volatile memory 108, non-volatile memory 110 and control circuitry 112. In one embodiment, non-volatile memory 110 is included in an embedded multimedia card (eMMC) of the system controller 106. Each data storage drive 104 may include a controller 114 that includes one or more microprocessors. The controller 114 generally provides top level communication and control for data storage drive 104 in conjunction with programming for controller 114 that may be stored in any suitable memory within data storage drive 104. Each data storage drive 104 includes one or more data storage discs 116 mounted on a spindle 118, such that the discs 116 are rotated at a substantially high speed by rotation of the spindle by a motor (not shown). One or more heads 120 communicate with the surface(s) of discs 116 to carry out data read/write operations on tracks 121. The head(s) 120 may fly above the disc surface(s) with clearance as little as about 1-2 nanometers or less during read/write operations. A radial position of heads 120 over a data storage disc 116 is controlled through the application of current to a coil in an actuator assembly 122. In addition to the disc(s) 116 that provide non-volatile memory, data storage drive 104 may include volatile memory (e.g., dynamic random access memory (DRAM)) 124 that provides temporary data storage in the data storage drive 104.

As indicated above, each data storage drive (e.g., HDD) 104 has many background activities that help maintain data storage drive 104 health, performance, data integrity, etc. These activities may include storing internal drive management data (e.g., ATI-related information, error correction coding information, FAFH data, etc.) 123. As in conventional data storage drives, data storage drive 104 stores the internal drive management data 123 in volatile memory 124 for use in supporting real-time operations that take place in drive 104. However, unlike conventional data storage drives, data storage drive 104 does not store copies of the internal drive management data 123 in a system zone of the disc(s) 116. Instead, in embodiments of the disclosure, copies of the internal drive management data 123 are stored in non-volatile memory 110 of system controller 106. Commands used to transfer the internal drive management data 123 between the data storage drive 104 and the system controller 106 depend upon the type of communication interface employed between the drive 104 and the system controller 106. In some embodiments, when the data storage drive 104 is a HDD, new HDD commands may be implemented for transferring the HDD's internal drive management data 123 between the storage system controller 106 and the HDD through, for example, a serial advanced technology attachment (SATA)/a serial attached SCSI (SAS) interface. Example commands are:

For a SAS interface—new SCSI read/write buffer mode commands to transfer the HDD's internal data between the storage system controller and the HDD via the SAS interface.

For a SATA interface—new advanced technology attachment (ATA) read/write log extent commands to transfer the HDD's internal drive management data 123 between the storage system controller 106 and the HDD via the SATA interface.

It should be noted that interfaces other than SAS or SCSI with any suitable commands for communicating internal drive management data 123 may be employed in different embodiments. When a particular HDD 104 receives the read log extent command (for the SATA interface) or the read buffer mode command (for the SAS) from the system controller 106, the drive controller 114 of that HDD 104 transfers the internal drive management data 123 in a compressed or an uncompressed form to the system controller 106. An identifier (e.g., serial number or any other suitable identification information) of the particular HDD 104 may be sent by that HDD 104 to the system controller 106 along with its internal drive management data 123. Control circuitry 112 of the system controller 106 may initially store the internal drive management data 123 and identification information received from the HDD 104 in volatile memory 108, and, at an opportune time, transfer the internal drive management data 123 and identification information for the particular HDD 104 to the non-volatile memory 110. Then the internal drive management data 123 and the associated identification information of the particular HDD 104 is stored in the non-volatile memory 110 along with internal drive management data 123 and identification information of other data storage drives 104 in the data storage system 100.

Figure 1C:
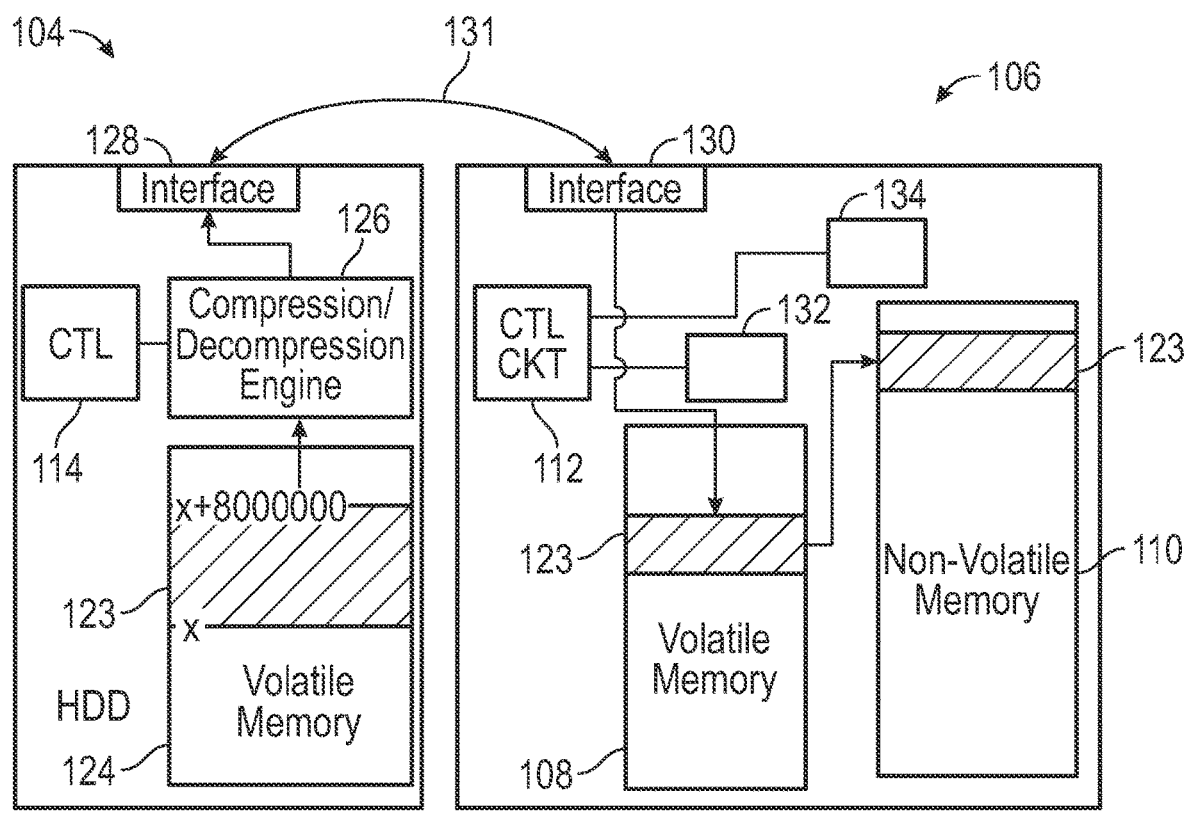
FIG. 1C is a diagrammatic illustration showing a mapping of a volatile memory of a data storage device into a non-volatile memory space of a system controller in accordance with one embodiment.

FIG. 1C is a diagrammatic illustration showing a mapping of volatile memory 124 of a data storage drive 104 into a non-volatile memory 110 space of the system controller 106 in accordance with one embodiment. In one embodiment, data storage drive (e.g., HDD) 104 includes a compression/decompression engine 126 that may include hardware and/or firmware that may be a part of drive controller 114 or may be separate from drive controller 114. In such an embodiment, data may be compressed by compression/decompression engine 126 under the control of drive controller 114 before being transferred to the system controller 106 via a drive interface 128. System controller 106 communicates with the data storage device 104 via a system controller interface 130 and a wired or wireless communication link 131 between the system controller 106 and the data storage drive 104. In addition to the elements described above in connection with FIG. 1A, system controller 106 may also include a drive data extraction module 132 and drive data transfer module 134. Modules 132 and 134 may include hardware and/or firmware that are a part of, or separate from, control circuitry 112.

When system controller 106 detects one or more first predetermined conditions of the data storage drive 104, which are described further below, it directs drive data extraction module 132 to send a first command to the data storage drive 104. The first command is sent to extract internal drive management data 123 from the data storage drive 104. In response to receiving the first command in data storage drive 104, with the help of compression/decompression engine 126, drive controller 104 compresses the internal drive management data 123 (e.g., data from locations X through X+800000 of volatile memory 124) and sends the compressed internal drive management data 123 along with drive identification information to the system controller 106. Control circuit 112 of system controller 106 receives the internal drive management data 123 via interface 130 and, as noted above, may first store the received internal drive management data 123 and identification information in volatile memory 108, and then transfer the received internal drive management data 123 and identification information from volatile memory 108 to non-volatile memory 110. Of course, the received data and identification information may also be directly stored in non-volatile memory 110 without initial storage in volatile memory 108.

When system controller 106 detects one or more second predetermined conditions of the data storage drive 104, which are described further below, data transfer module 134 is directed by system controller 106 to send the internal drive management data 123 to the data storage drive 104 using a second command. In response to receiving the second command in data storage drive 104, drive controller 114 decompress the received internal drive management data with the help of compression/decompression engine 126, and stores the decompressed internal drive management data in volatile memory 124 for use in the data storage drive 104.

Figure 2A:
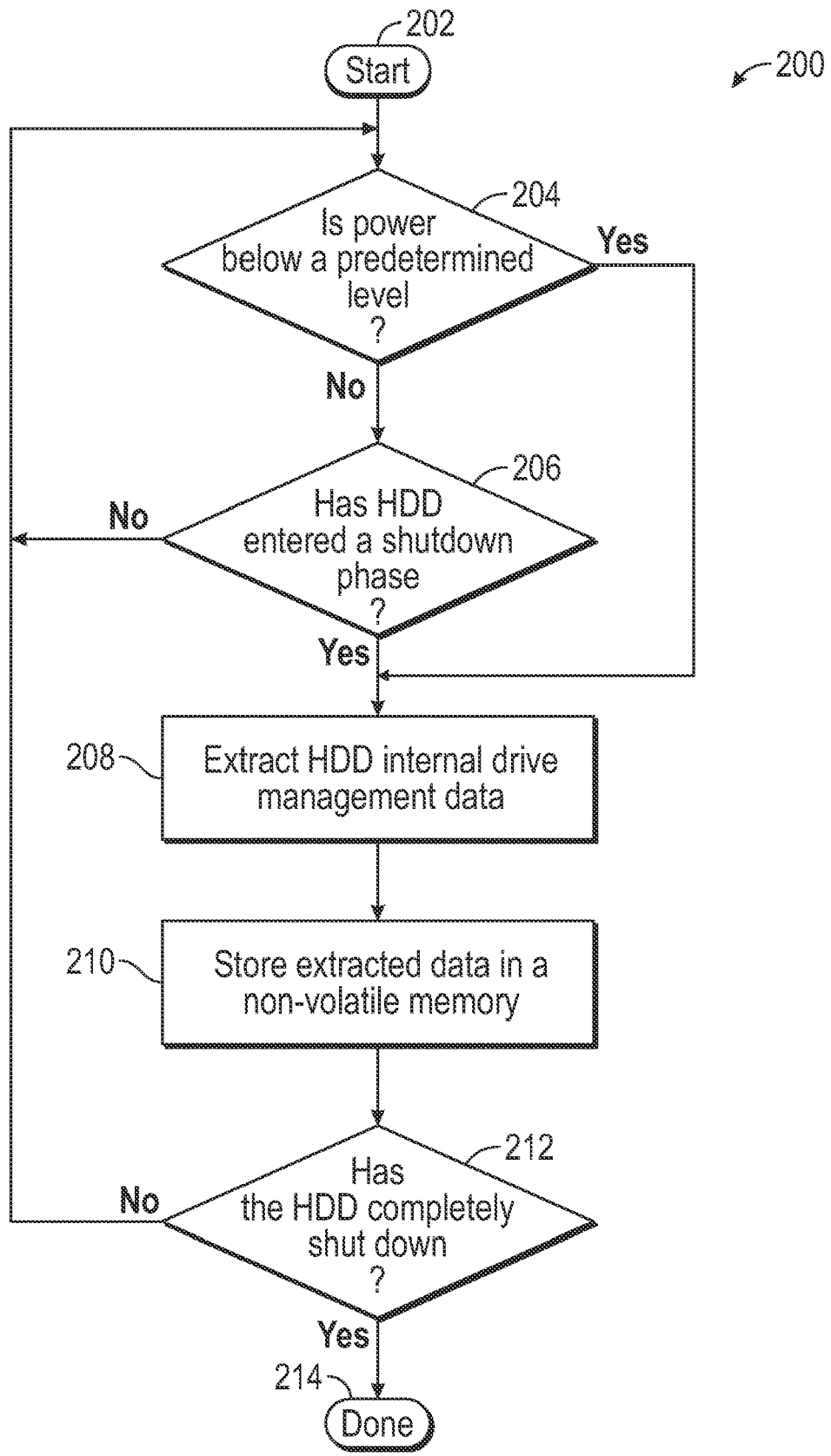
FIGS. 2A and 2B are flow diagrams showing workflows of a storage system controller and an individual data storage device, respectively, for transferring internal drive management data from the data storage device to the storage system controller in accordance with one embodiment.
Figure 2B:
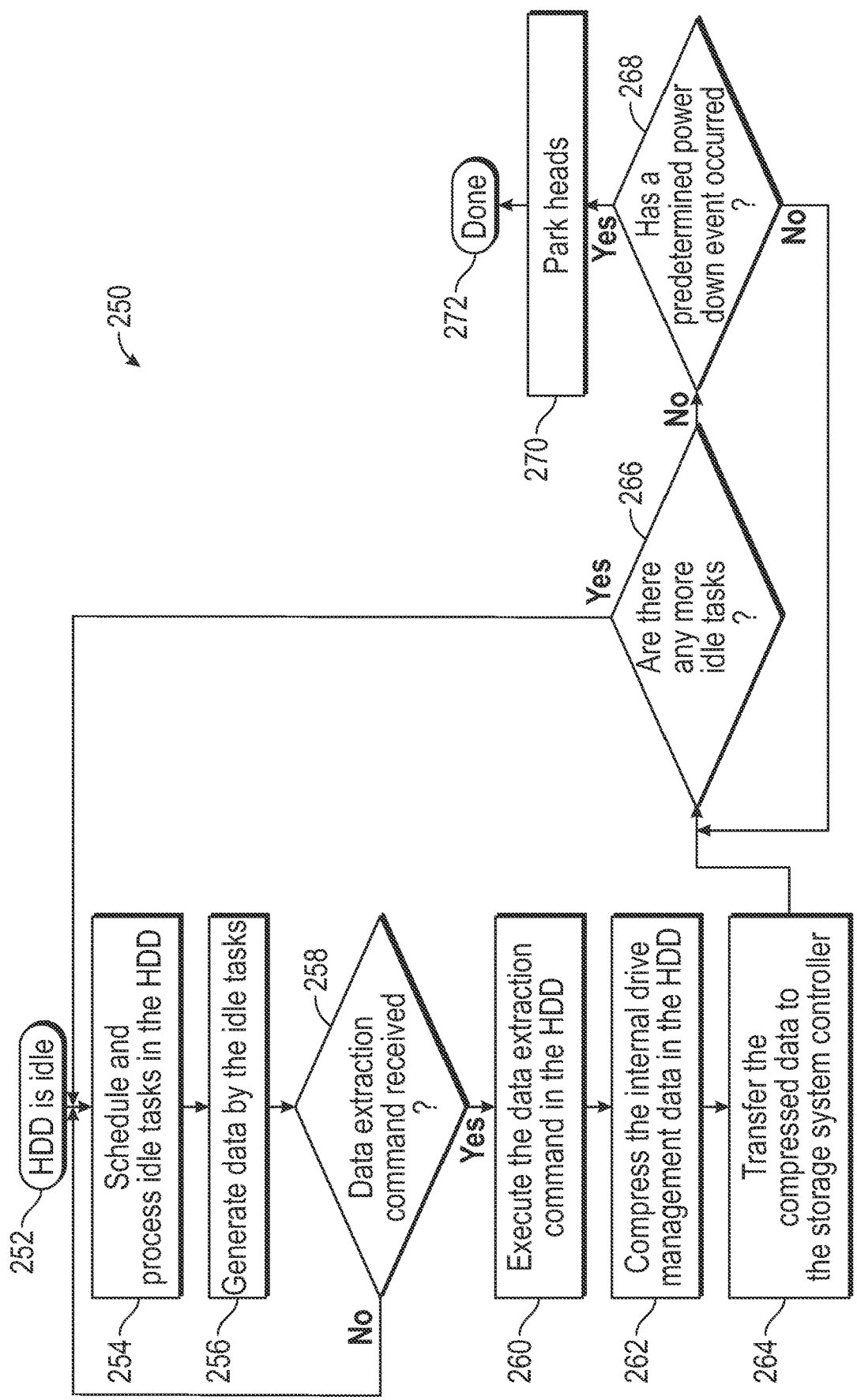

FIGS. 2A and 2B are flow diagrams showing workflows of a storage system controller and an individual HDD, respectively, for transferring internal drive management data from the HDD to the storage system in accordance with one embodiment. It should be noted that, although the flow diagrams of FIGS. 2A and 2B use a HDD as the data storage drive, the flow diagrams are also applicable to other types of data storage drives (e.g., hybrid drives).

Referring to FIG. 2A, process 200 starts at 202, and then proceeds to 204 where a determination is made (e.g., by system controller 106 of FIGS. 1A and 1C) as to whether an individual HDD has entered a low power mode in which the power consumed by the HDD is below a predetermined power level, but the HDD has not entered into a power shutdown phase. It should be noted that the HDD may have multiple low power modes. For example, a first low power mode may be one that the HDD enters into when it is not servicing host commands, but only carrying out internal data transfer operations. A second low power mode of the HDD may be lower than the first low power mode, and the HDD may not service host commands and may not carry out internal data transfers in this mode. The HDD may also be at power levels lower than the second low power mode, but may still not be in the power shutdown phase. The predetermined power level may be any suitable low power level. If the HDD power is below the predetermined power level, control passes to 208. If the HDD power is not below the predetermined power level, at 206, a determination is made as to whether the HDD has entered into a power down phase. If the HDD has not entered into the power down phase, control returns to 204. If the HDD has entered into the power down phase, control passes to 208. At 208, the storage system controller 106 extracts the HDD's internal drive management data using a suitable data read/data extraction command. For example, when a SATA interface is employed, the system controller 106 issues a read log extent command to extract the internal drive management data from the data storage drive, and when a SAS interface is employed, the system controller 106 issues a read buffer mode command to extract the internal drive management data from the data storage drive. At 210, the extracted internal drive management data is stored in a non-volatile memory 110 of the system controller 106. At 212, a determination is made as to whether the last HDD has completely shut down. If the last HDD has not completely shut down, the process returns to 204. If the last HDD has completely shut down, the process ends at 214. If, for example, 128 MB of data per HDD is to be saved in non-volatile memory 110 of system controller 106 of storage system 100 that has 100 HDDs, and the compression rate is 50%, about 6 gigabytes (GB) of non-volatile memory 110 space will be used for storing the entire internal drive management data of system 100. A process 250 for transferring internal drive management of a single HDD to the system controller is described below in connection with FIG. 2B.

Referring now to FIG. 2B, process 250 begins at 252 where the HDD is in an idle state. At 254, the HDD schedules and processes idle tasks. At 256, the idle tasks generate data. At 258, a determination is made (e.g., by drive controller 114) as to whether a data read/data extraction command is received in the HDD from the system controller 106. If the data read/data extraction command is not received in the HDD, control returns to 254. If the data read/data extraction command is received in the HDD, at 260, the drive controller 114 executes the received data read/data extraction command. At 262, the HDD compresses the internal drive management data. At 264, the HDD transfers the compressed internal drive management data to the storage system controller 106. It should be noted that, in alternate embodiments, at 264, data may be sent to the storage system controller in an uncompressed form, thus eliminating 262. At 266, a determination is made as to whether there are any more idle tasks. If there are one or more remaining idle tasks, control returns to 254. If there are no remaining idle tasks, at 268, a determination is made as to whether a predetermined power down event (e.g., expiration of a power down timer) has occurred. If the predetermined power down event has not occurred, control returns to 266. If the predetermined power down event has occurred, at 270, heads of the HDD are parked, and the process ends at 272.

As described earlier in connection with FIG. 1C, system controller 106 includes a drive data transfer module 134 that transfer the internal drive management data 123 back to the individual HDDs within the data storage system 100. Such a data transfer process is described below in connection with FIG. 3.

Figure 3:
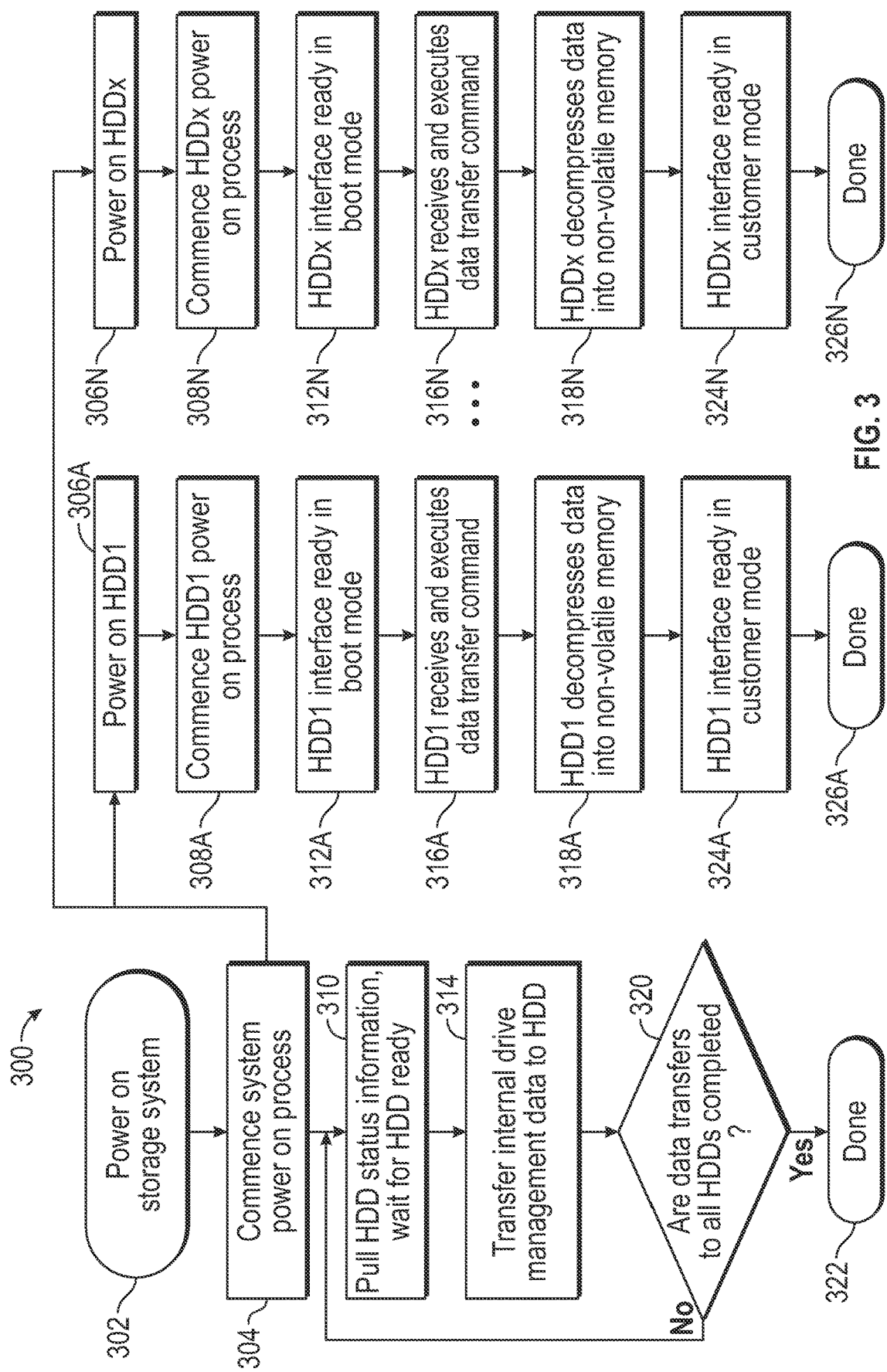
FIG. 3 is a flow diagram of a method of transferring drive internal management data from a storage system controller to individual data storage drives in the storage system in accordance with one embodiment.

Referring to FIG. 3, process 300 begins at 302 where the storage system 100 is powered on. At 304, a system power on process is commenced. The power on process includes powering on individual HDDs (e.g., HDD1-HDDx) at 306A-306N, which may take place in parallel. HDDs 1-*x* then carry out their individual power on processes at 308A-308N, which may take place in parallel. At 310, which may take place in parallel with 308A-308N, the system controller obtains status information for HDDs 1-*x*, and waits for HDDs 1-*x* to be ready. At 312A-312N, interfaces of HDDs 1-*x* are ready to communicate with the system controller 106. At 314, the system controller 106 transfers different internal drive management data to the respective HDDs 1-*x* using a suitable data transfer command (e.g., SCSI read/write buffer mode command for a SAS interface, ATA read/write log extent command for a SATA interface, etc.). Extending the numerical example provided above, and assuming 64 MB of compressed data per HDD is stored in the non-volatile memory of the system controller, the transfer of the internal drive management data from the system controller to one HDD will take about 85 milliseconds (ms) with a 6G interface speed, and the system controller 106 can carry out the internal drive management transfers to different HDDs in the system concurrently. Transferring data to the HDD and spinning up the HDD may also be performed concurrently to reduce HDD TTR.

At 316A-316N, each HDD of HDDs 1-$x$ receives its internal drive management data via the data transfer command, and executes the received command. If the internal drive management data received by each HDD of HDDs 1-$x$ is compressed, then the received internal drive management data is decompressed and stored in volatile memory at 318A-318N, which may take place in parallel. If the internal drive management data is not compressed, then the internal drive management data for HDDs 1-$x$ is directly stored in volatile memory at 318A-318N. At 320, the system controller determines whether the internal drive management data transfers for all of HDDs 1-$x$ are completed. If all data transfers are completed, the process for the system controller ends at 322. If all data transfers are not completed, control passes to 310. At 324A-324N, HDDs 1-$x$ are ready to receive user data. Processes for all HDDs 1-$x$ end at 326A-326N.

In the above-described embodiments, the system controller may maintain an index table that includes serial numbers or other identifying data of HDDs in the data storage system. When a HDD is replaced, its serial number or other identifying data is no longer employed, and a serial number or other identifying data of the installed replacement HDD is added to the index table.

In embodiments of the disclosure, HDDs are configured with functions to support the extraction of the internal drive management data for external storage. An identification bit may be included in an interface function of the HDD to indicate that the extraction of the internal drive management data is supported. For example, a bit in an identification function may be employed for a HDD with a SATA interface or a bit in a mode page may be employed for a HDD with a SAS interface. The HDD will enable the internal drive management data extraction feature in response to receiving a set feature sub-command (for SATA) or mode page control command (for SAS). As indicated above, the HDD will implement read/write buffer mode commands (SAS) or read/write log extent commands (SATA) to transfer the internal drive management data to the system controller. A suitable data structure, and compression and decompression are designed for the HDD to implement the transfer and receipt of the internal drive management data.

An advantage of the above-described embodiments includes reduced HDD power consumption since the HDD does not seek and write internal drive management data into system zones of disc media. This increases the HDD's data transfer performance for user data. A software service may be provided to customers to make use of the internal drive management data extraction feature.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage system comprising:
   a plurality of data storage drives each having internal drive management data stored in volatile memory of a respective data storage drive; and
   a system controller, external to and coupled to each data storage drive of the plurality of data storage drives, the system controller configured to, for each data storage drive of the plurality of data storage drives, store the internal drive management data in non-volatile memory of the system controller, extract the internal drive management data from the volatile memory for storage in the non-volatile memory, and provide the stored internal drive management data to the data storage device volatile memory.

2. The data storage system of claim 1 and wherein the system controller is configured to extract the internal drive management data from a respective data storage drive for storage in response to at least one first predetermined event.

3. The data storage system of claim 2 and wherein the at least one first predetermined event is a power level of the respective data storage drive falling below a first predetermined threshold.

4. The data storage system of claim 2 and wherein the system controller is configured to send the internal drive management data to the respective data storage drive in response to at least one second predetermined event.

5. The data storage system of claim 4 and wherein the at least one second predetermined event is the respective data storage drive entering into a ready state in a boot mode after power up of the respective data storage drive.

6. A data storage drive comprising:
a volatile memory configured to store internal drive management data; and
a drive controller communicatively coupled to the volatile memory, the drive controller configured to send the internal drive management data to a non-volatile memory of a system controller that is external to the data storage drive.

7. The data storage system of claim 6, and wherein the drive controller is configured to send the internal drive management data to the system controller in response to receiving a data extraction command from the system controller.

8. The data storage system of claim 7 and wherein the system controller is configured to send the data extraction command to the data storage drive in response to at least one first predetermined event.

9. The data storage system of claim 8 and wherein the at least one first predetermined event is a power level of the data storage drive falling below a first predetermined threshold.

10. The data storage system of claim 8 and wherein the system controller is configured to send the internal drive management data from the non-volatile memory to the data storage drive in response to at least one second predetermined event.

11. The data storage drive of claim 10 and wherein the at least one second predetermined event is the data storage drive entering into a ready state in a boot mode after power up of the data storage drive.

12. A method comprising:
extracting, by a system controller, internal drive management data from volatile memory of each data storage drive of a plurality of data storage drives in a data storage system including the system controller; and
storing the extracted internal drive management data external to the plurality of data storage drives in a non-volatile memory of the system controller.

13. The method of claim 12 and wherein the extracting is carried out in response to at least one first predetermined event.

14. The method of claim 13 and wherein the at least one first predetermined event is a power level of at least one of the plurality of data storage drives falling below a first predetermined threshold.

15. The method of claim 13 and further comprising sending, from the non-volatile memory of the system controller, the internal drive management data to at least one of the plurality of data storage drives in response to at least one second predetermined event.

16. The method of claim 15 and wherein the at least one second predetermined event is the at least one of the data storage drives entering into a ready state in a boot mode after power up of the at least one of the data storage drives.

* * * * *